May 28, 1935.   G. F. RICHTER   2,002,716
COSMETIC HOLDER
Filed March 18, 1933   2 Sheets-Sheet 1
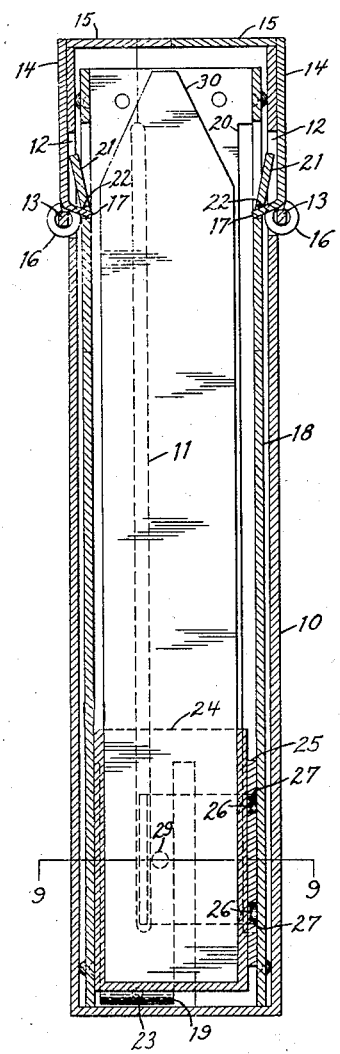
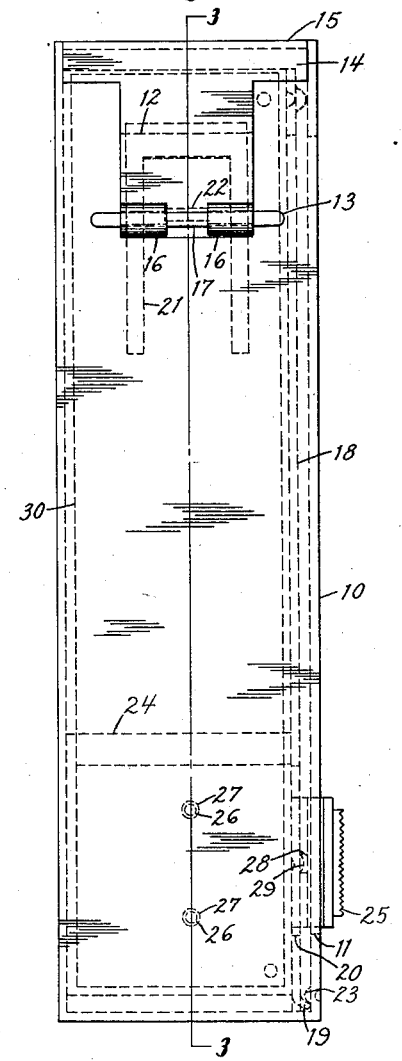
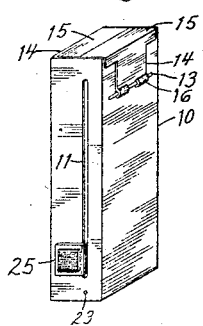
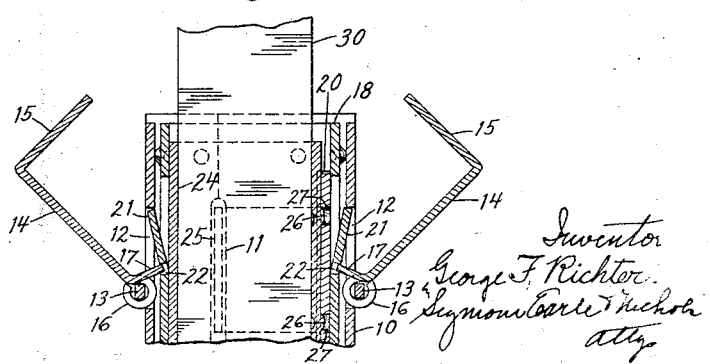

May 28, 1935.  G. F. RICHTER  2,002,716
COSMETIC HOLDER
Filed March 18, 1933   2 Sheets-Sheet 2
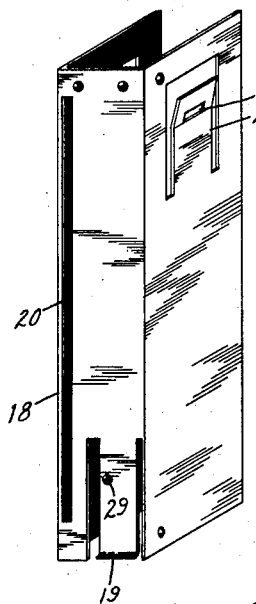
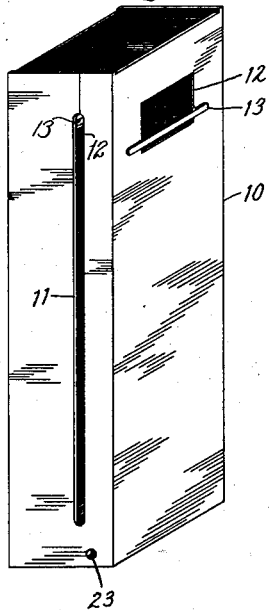
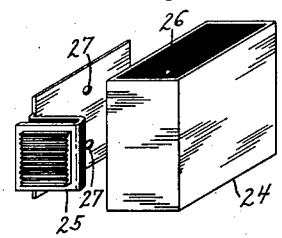
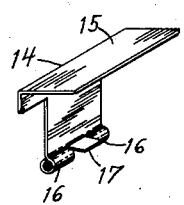
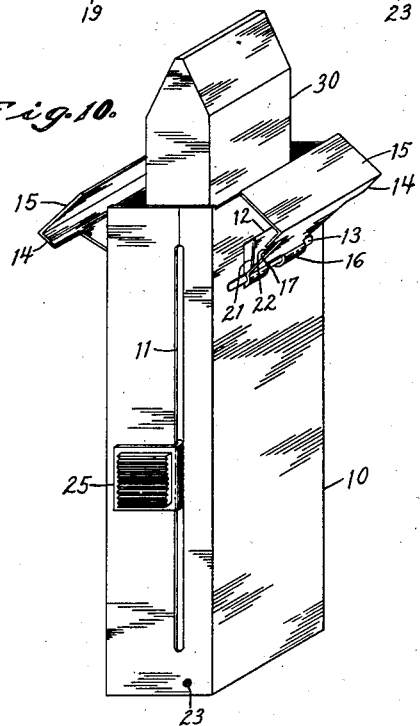
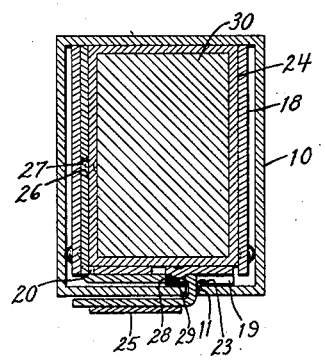
Inventor
George F. Richter
Seymour Earle Nichols
Attys Patented May 28, 1935

2,002,716

UNITED STATES PATENT OFFICE 2,002,716

COSMETIC HOLDER

George F. Richter, Bogota, N. J., assignor to Consolidated Safety Pin Company, Bloomfield, N. J., a corporation Application March 18, 1933, Serial No. 661,494

6 Claims. (Cl. 206—56)

This invention relates to an improvement in cosmetic holders, and while particularly adapted for lipstick holders, may obviously be used for other material.

The object of the invention is to provide a device by which the initial movement of the operating finger-piece will open the covers, and further movement of the finger-piece project the lipstick or other material beyond the upper end of the container.

These and other objects will be understood in connection with the following description, reference being had to the accompanying drawings, in which:

Fig. 1 is a perspective view of a holder embodying my invention;

Fig. 2 is a side view of the device, enlarged;

Fig. 3 is a sectional view on the line 3—3 of Fig. 2;

Fig. 4 is a transverse sectional view of the upper end of the device, showing the covers open;

Fig. 5 is a perspective view of the inner casing, detached;

Fig. 6 is a perspective view of the outer casing, detached;

Fig. 7 is a perspective view of the container, detached;

Fig. 8 is a perspective view of one of the covers, detached;

Fig. 9 is a sectional view on the line 9—9 of Fig. 3; and

Fig. 10 is a perspective view showing the covers open and a lipstick projecting beyond them.

In carrying out my invention, I employ a hand-grip support or outer casing 10 formed on one side with a longitudinal slot 11 and at the front and back with openings 12, adjacent to the lower edges of which pins 13 are mounted, and on these pins the covers 14 turn, each cover formed with a top-portion 15 which, together, close the upper end of the casing. The covers are formed with knuckles 16 through which the pins 13 extend. Between the knuckles 16 each cover has a portion in the form of an inwardly-projecting extension or tongue 17 for the purpose which will hereinafter appear.

Within the outer casing is an inner casing 18 closely fitting the outer casing and formed on one side near the lower end with a spring latch-finger 19, on the same side with a longitudinally-arranged slot 20, and at the front and back near the upper end with outwardly-projecting limit-fingers 21 formed with slots 22 into which the lips 17 of the covers may extend, the inner casing being slightly shorter than the outer casing in which it is locked in its closed position by engagement of the end of the spring latch-finger 19 with an inwardly-extending lug 23 in the outer casing. Within the inner casing is a container 24 containing a lipstick 30 or other suitable material and coupled with this container is an operating finger-piece 25 extending inward through the slot 11 in the outer casing, thence to one side through the slot 20 in the inner casing and is coupled with the container by providing the container with lugs 26 adapted to enter openings 27 formed for it in the finger-piece. The finger-piece is releasably coupled to the inner casing by a perforation 28 in the finger-piece releasably engaging with a lug 29 on the inner casing. The container 24, inner casing 18 and finger-piece 25 comprise an elevator, of which the finger-piece 25 is an operating portion.

Assuming the container 24 and lipstick 30 to be in retracted position (Figs. 2 and 3) with the spring latch-finger 19 engaging below the lug 23 and with the perforation 28 releasably engaged with the lug 29, when the finger-piece 25 is pushed upward, the container 24 and casing 18 also move upward and the spring latch-finger 19 first moves out and up slightly past the lug 23. Meanwhile, the extensions or tongues 17 of the covers or cover parts 14 are swung about the cover hinges or pivots at 16 to swing the covers open (Fig. 4) until the upper ends of the limit-fingers 19 engage against the upper edges of the openings 22 whereupon the upward movement of the inner casing 18 stops, and as the finger-piece 25 is pushed still further upward, the perforation 28 of the finger-piece 25 snaps out of its releasable engagement with the lug 29 and the finger-piece 25, container 24 and lipstick 30 continue upward until the finger-piece 25 reaches its limit of movement or until the lipstick is expelled sufficiently for satisfactory use. After such use, the finger-piece 25 is pushed downward to retract the lipstick. Due to the engagement of the spring latch-finger 19 of the inner casing 18 against the upper side of lug 23, the inner casing 18 remains in its upper position with the covers open while the lipstick 30 and finger-piece 25 travel downward until the finger-piece engages the lower end of the slot 20 of the inner casing 18, whereupon further movement of the finger-piece forces the inner casing to move down until the spring latch-finger 19 moves out and down past the lug 23 into its lower latching position (Fig. 2), the downward movement of the inner casing acting to swing the extensions 17 and the covers of which they are part, closed. Meanwhile, the peration 28 has again been brought into its releasable engagement with the lug 28, ready for the next opening or expelling movement.

These parts are readily formed from sheet metal and the assemblage of the parts is easily performed and provides a construction in which the covers are opened and the contents exposed by the movement of the operating finger-piece, so that these operations are performed with one hand.

I claim:

1. A cosmetic holder comprising an outer and an inner casing, the outer casing formed with openings at the front and back, covers hingedly connected with said outer casing, the inner casing formed with limit fingers coupled with said covers and projecting into the openings of the outer casing, whereby upward movement of the inner casing is limited, said inner and outer casings formed with longitudinal slots, and a container within the inner casing and a finger-piece connected with the container and extending outward through the slots in the inner and outer casings and releasably engaging the inner casing.

2. A cosmetic holder comprising an outer casing formed on one side with a longitudinal slot and at the back and front, near its upper end, with openings, pins secured adjacent to the lower edges of the said openings, covers mounted on said pins and formed with inwardly-extending extensions, an inner casing within the outer casing and formed with a longitudinal slot and with limit-fingers, each formed with an opening to receive the extensions of the covers, a container in the inner casing, a finger-piece connected with the container and extending outward through the slots in the inner and outer casings and releasably engaging the inner casing.

3. A cosmetic holder comprising: a casing having a face and an opening in said face; a cover hinged to said face and adjacent said opening and at a distance considerably below the top edge of the casing; an elevator in the casing adapted to be moved upward and downward; and means extending through said opening in the casing and transverse to the axis of said hinge and operatively connecting said elevator and said cover, whereby when said elevator is moved upward, said cover is positively swung open and when said elevator is moved downward, said cover is positively swung closed.

4. A cosmetic holder comprising: a casing having two opposite faces each with an opening; a cover comprising two oppositely-movable parts each hinged to one of said faces and adjacent one of said openings and at a distance considerably below the top edge of the casing; an elevator in the casing adapted to be moved upward and downward; and means extending through each of said openings in the casing and transverse to the axes of said hinges and operatively connecting said elevator and said cover parts, whereby when said elevator is moved upward, said cover parts are positively swung open and when said elevator is moved downward, said cover parts are positively swung closed.

5. A cosmetic holder comprising an outer casing and an inner casing fitting said outer casing and movable longitudinally but not laterally of said outer casing, covers hinged to the outer casing at a location considerable below the top of the casing and having extensions coupled with the inner casing for movement thereby, a container within the inner casing and a finger-piece coupled with the container and extending outward through the inner and outer casings and releasably engaging the inner casing.

6. A cosmetic holder comprising: an outer casing; an inner casing fitting said outer casing and movable longitudinally but not laterally of said outer casing; a cover comprising two oppositely-movable parts each hinged to the outer casing at a location considerably below the top of said casing; said inner casing having means to positively engage and swing said cover parts open when moved upward, and positively engage and swing said cover parts closed when moved downward.

GEORGE F. RICHTER.